United States Patent
Binswanger et al.

(10) Patent No.: US 11,022,563 B2
(45) Date of Patent: Jun. 1, 2021

(54) METHOD FOR MONITORING A PROTECTIVE GLASS

(71) Applicant: Scansonic MI GmbH, Berlin (DE)

(72) Inventors: Martin Binswanger, Neuwied (DE); Michael Ungers, Berlin (DE)

(73) Assignee: Scansonic MI GmbH, Berlin (DE)

( * ) Notice: Subject to any disclaimer, the term of this patent is extended or adjusted under 35 U.S.C. 154(b) by 137 days.

(21) Appl. No.: 16/270,608

(22) Filed: Feb. 8, 2019

(65) Prior Publication Data

US 2019/0242832 A1 Aug. 8, 2019

(30) Foreign Application Priority Data

Feb. 8, 2018 (DE) .......................... 102018102828.8

(51) Int. Cl.
| | |
|---|---|
| *G01N 21/94* | (2006.01) |
| *H04N 5/33* | (2006.01) |
| *B23K 26/38* | (2014.01) |
| *H04N 5/765* | (2006.01) |
| *G01N 21/958* | (2006.01) |
| *H04N 5/917* | (2006.01) |

(52) U.S. Cl.
CPC ............ *G01N 21/94* (2013.01); *B23K 26/38* (2013.01); *G01N 21/958* (2013.01); *H04N 5/33* (2013.01); *H04N 5/765* (2013.01); *H04N 5/917* (2013.01)

(58) Field of Classification Search
CPC .... G01N 21/94; G01N 21/958; B23K 26/082; B23K 26/242; B23K 26/707
See application file for complete search history.

(56) References Cited

U.S. PATENT DOCUMENTS

| | | | | |
|---|---|---|---|---|
| 8,890,023 | B2* | 11/2014 | Dorsch | B23K 26/20 |
| | | | | 219/121.64 |
| 9,082,201 | B2* | 7/2015 | Allen | G06T 7/90 |
| 10,083,589 | B2* | 9/2018 | Winkler | B23K 26/38 |
| 2013/0062324 | A1* | 3/2013 | Dorsch | B23K 26/032 |
| | | | | 219/121.63 |
| 2014/0193042 | A1* | 7/2014 | Allen | G06T 7/0004 |
| | | | | 382/108 |
| 2018/0151048 | A1* | 5/2018 | Winkler | B33Y 30/00 |
| 2019/0160599 | A1* | 5/2019 | Izumi | B23K 26/705 |
| 2019/0219522 | A1* | 7/2019 | Izumi | B23K 26/706 |

* cited by examiner

*Primary Examiner* — Boubacar Abdou Tchoussou
(74) *Attorney, Agent, or Firm* — Michael Soderman

(57) ABSTRACT

Monitoring of protective glasses (8) in laser machining heads, which are exposed to dust, sputtering and/or soiling, with the aim of predicting the contamination of the protective glass. For this purpose, image sections (19) are captured by means of at least two image capture systems (16) at capture-times, computer-readable image files are stored by means of a frequency-based compression algorithm, and a file size value (kB) is determined for each image file on the basis of its file size. A signal is generated if for a majority of the image capture systems (16) the file size values (kB) decrease and/or are below one of a predefined number of threshold values (20) for a predetermined minimum number of consecutive capture-times.

8 Claims, 2 Drawing Sheets

METHOD FOR MONITORING A PROTECTIVE GLASS

CROSS REFERENCE TO RELATED APPLICATIONS

This application claims the priority of DE 102018102828.8 filed on 2018 Feb. 8; this application is incorporated by reference herein in its entirety.

BACKGROUND

The invention relates to a method and an apparatus for checking the condition of a protective glass arranged at a laser optics in a laser machining system, which e.g. is used for joining of workpieces by means of a laser beam, with respect to becoming dirty, thus requiring a cleaning or replacement of the protective glass.

During joining, e.g. welding or soldering, or when cutting workpieces by means of a laser beam, splashes or flue gases are usually produced which can contaminate the laser processing head, in particular the glass for decoupling the laser beam onto the workpieces. On the one hand, an increase in turbidity reduces the amount of laser power available for the machining process. On the other hand, adhering splashes can deflect and/or scatter the laser beam, whereby the laser energy absorbed by the splash can lead to damage (e.g. melting, craters and cracks) or even to breakage of the protective glass.

Protective-glass monitors are known from the prior art which detect the temperature of the protective glass and generate an error signal when a temperature limit value is exceeded. For example, EP 1 310 782 A1 discloses determining the temperature by measuring an electrical resistance. It is proposed in DE 10 2004 006 565 A1 to measure a change in the length of an optical element and subsequently to determine a temperature change from the change in length.

Disadvantages of these monitoring devices are a time lag caused by the low heat conductivity of glass as well as a dependence on the ambient temperature, i.e. in cold environments the monitoring may react too late, since a higher degree of contamination is necessary to trigger the error signal in comparison to warm environments.

A method for monitoring a protective glass working independently of the ambient temperature can be found in U.S. Pat. No. 10,083,589 B2. This method relies on temperature changes of the protective glass caused by switching on and off the laser, which is used for e.g. welding.

Systems based on scattered light measurement are also known. However, contamination monitoring by means of scattered light measurement shows dependencies on the type of contamination (absorption or reflection of the measuring light) as well as on the position of the contamination on the protective glass. Also, it may be difficult to separate the scattered light from stray light resulting from the process, so monitoring may be unreliable.

DE 203 14 918 U1 shows a device for monitoring a protective glass of a laser optic for breakage and/or contamination, wherein at least one photodetector, which is arranged on the circumference of the end face of the protective lens and is connected to an evaluation device, is provided, to which at least one electromagnetic radiation source is assigned, the electromagnetic radiation of which is coupled via the end face of the protective glass. However, this device only detects disturbances occurring within the glass, whereas surface contaminants are hardly detectable.

The caloric and optical methods have in common that additional devices, such as temperature or light sensors, to be attached to the protective glass are necessary for monitoring.

SUMMARY

It is an object of the invention to avoid the above-mentioned disadvantages, such as a dependency of the contamination monitoring on the ambient temperature, by creating a method for monitoring a protective glass that can be used for any kind of (light-absorbing) pollution wherein the method is both, insensitive to interference as well as inexpensive.

The object of the invention is achieved by the method having the features of the independent claim. Further advantageous embodiments of the invention result from the dependent claims.

DETAILED DESCRIPTION

According to the invention, the method provided for monitoring a protective glass of a laser processing device for contamination comprises capturing images at a plurality of given capture times by means of an image capture system, wherein said images show an area of the surface of a workpiece to be machined during the laser machining process.

Here, at least two image acquisition systems are used, both of which may be part of the laser processing apparatus.

In the following, the term "image section" is used for an image of the workpiece surface or a partial area thereof.

Thus, at given, preferably regular, intervals of e.g. one minute, an image section is captured and saved together with the capture time. The image section is captured behind the protective glass, i.e. the protective glass is arranged between the image capture system for capturing the image section and the workpiece.

The workpiece must have a light emission in the area of the image section to be captured, which allows structures to become visible on the surface of the workpiece. In this context, light radiation is generally understood as electromagnetic radiation detectable by an image capture system. This light radiation can be caused by a reflection of extraneous light radiated onto the workpiece, e.g. ambient light. The light radiation can also originate from a light emission inherent to the workpiece, which, for example, is heated to a temperature at which it emits sufficient electromagnetic radiation in the frequency range detectable by the image capture system.

The image sections have a given geometric shape and dimension, which preferably remain the same during the entire monitoring period. However, the geometric size and/or shape of the image section captured by the respective image capture system may be different from the geometric size and/or shape of the image section captured by another image capture system or systems.

According to the invention, each captured image section is stored in a computer-readable image file in an image file repository, e.g. volatile or non-volatile memory of a computer, the image file data being processed prior to storage by means of a frequency analysis based compression algorithm so as to reduce the storage space required by an image file. Preferably, a lossless compression algorithm is used here.

A file size value is determined with the help of the file size of the compressed image file. That is to say, a calculation formula is adopted in order to determine said file size value, wherein the actual file size is used as an input parameter for the calculation formula. This file size value can be determined separately for each image file, but also on the basis of the file sizes of several image files captured chronologically one after the other, i.e. a sequence of a given number of successively captured image sections. In the simplest case this file size value is for example the file size of the compressed image file. From these file size values and the respective capture times assigned to them, a list is then compiled, e.g. a constantly growing list, in which a file size value is stored for each capture time. Said list may comprise file size values of all image capture systems assigned to a respective capture time; alternatively, a separate list of file size values is created for each image capture system.

By processing the captured image sections using a frequency analysis based compression algorithm, any change in the image composition causes a change in the file size of the compressed image file. In particular, any contamination of the protective glass, through which the surface of the workpiece is detected, has an influence on the file size of the compressed image file, since the contamination causes blurring in the captured image section. Image blur in turn causes a reduction in image detail, which means a reduction in the number of frequencies required for a Fourier synthesis of the blurred image.

Said processing may be performed using a computer connected to the laser processing device or a process control unit of the laser processing device.

Thus, the file size value determined on the basis of the file size of the compressed image files is a direct measure of contamination of the protective glass. Since the file size of the compressed image file decreases with increasing contamination of the protective glass, the file size values determined on the basis of the file size also decrease with increasing contamination.

Accordingly, as known from statistical process control, rules for evaluating the chronological sequence of file size values are defined. For example, one or more threshold values are defined for the file size value, below which a disturbance in the process, i.e. a dirty protective glass, is signaled. Alternatively or additionally, a rule for changing successive file size values can be defined that signal a dirty protective glass.

According to the rules known from statistical process control—for example a suitable selection from the so-called "Western Electric Rules"—a signal, e.g. a contamination warning signal, is generated if the file size values decrease and/or lie below the only or one of the specified threshold values for a specified minimum number of data acquisition points that are indirectly or directly consecutive in time. A signal, however, is only output if, for a sequence of capture times, the file size values for each—or, in the case of more than two image capture systems, already for a plurality—of the image capture systems meet the respective specified rule for detecting contamination, e.g. if they fall below the respective specified threshold value.

It may be provided that for each image capture system, separate threshold values are predetermined for the file size values determined on the basis of the file size.

The signal, e.g. contamination warning signal, may be generated by means of a computer, e.g. the same computer that is used for calculating the files size values, or by a control unit which is used to control the laser processing.

The advantage of the method according to the invention is that an image acquisition and data processing system already present in the laser processing apparatus can be used. This eliminates the need for additional equipment to be installed. The method can be performed automated, while operating fast, providing an instantaneous warning or error indication.

By engaging at least two independently working image capture systems the monitoring of the protective glass is redundant. Additionally, the monitoring can safely be performed even if one of the systems is failing.

According to an embodiment of the invention the file size value is determined by calculating the mean value of the file sizes of a predefined number of compressed image files of successively captured image sections. For example, the file size value, that is assigned to a given capture time, may be calculated by averaging the file sizes of the image file captured at that capture time, captured at the capture time immediately prior to that capture time, and captured at the capture time immediately subsequent to that capture time.

The invention can also be embodied such that the captured image sections are converted into a computer-readable image file in accordance with the JPEG standard (JPEG stands for "Joint Photographic Experts Group", the standard is also known as ISO/IEC 10918-1), wherein the compressed image files are saved in the well-known JPEG File Interchange Format (JFIF) graphics format.

Furthermore, it may be provided to define at least two threshold values, wherein a first threshold value is defined for a warning signal and a second threshold value for an error signal. Thus, a warning signal is generated if, according to the specified rule, the file size values assigned to a predetermined number, for example four, of indirectly or directly consecutive capture times are below the first threshold value. An error signal, preferably a stop signal for the laser processing apparatus, is generated if, according to the specified rule, the file size values of a predetermined number of indirectly or directly consecutive capture times lie below the second threshold value, wherein the second threshold value is smaller than the first threshold value. This error signal may be an electric signal generated by a computing unit, which may be a stand-alone competing unit connected to a control unit of the laser processing apparatus or may be part of a control unit of the laser processing apparatus, wherein, for example, the electric error signal causes a shutdown of the processing laser.

Furthermore, it can be provided that the warning signal is output permanently after its first occurrence—until e.g. a manual reset—or only during the time in which a warning condition is detected in accordance with the method (so that the warning display can e.g. go on and off several times— depending on the result of the individual, successive evaluations).

In particular, after generating the warning signal, the same can be reset if the file size values determined at a predetermined first number of temporally successive acquisition times remain within a predetermined standard deviation which was calculated, for example, from a predetermined second number of previously acquired file size values.

According to an embodiment of the invention, an infrared camera, which, for example, is sensitive for the wavelength range between 860 nm and 900 nm, is used as the image acquisition system.

Advantageously, an image acquisition system already present in the laser processing device, e.g. a system intended for guiding the laser beam along a given processing path or for quality assurance, can be used at least for image acquisition.

According to one embodiment of the method, at least one, e.g. external, light source can be used which illuminates the surface area of the workpiece captured by the image section.

That is to say, the light source irradiates the workpiece with electromagnetic radiation in such a way that the light reflected from the workpiece surface can be detected by the image capture system.

For example, one or more illumination modules can be inserted in the laser processing device in front of or behind the protective glass, wherein the illumination modules radiate directly onto the workpiece surface.

According to an embodiment of the invention, a film, i.e. a continuous sequence of images, is captured by means of the image capture system during laser processing, whereby at predetermined, recurring capture times at least one image section of an individual image of the film is compressed in each case by means of the compression algorithm based on frequency analysis and stored in the image file repository as computer-readable image file.

In an advantageous way, the method of monitoring a protective glass can be used in a processing head of a laser welding device comprising an optical system, e.g. a scanner optics, where the image acquisition system of a system for integrated process observation of the laser welding device is used for capturing the image sections. As an option, illumination modules for illuminating the workpiece surfaces can be arranged on the protective glass on its surface facing the laser optics. These illumination modules may be arranged directly adjacent to a protective glass holder, which is framing the protective glass.

BRIEF DESCRIPTION OF THE DRAWINGS

The invention is explained in more detail below with the aid of exemplary embodiments with reference to the figures, the same or similar features being provided with the same reference numerals; schematically shown therein are.

DETAILED DESCRIPTION OF THE PREFERRED EMBODIMENTS

Figure 1:
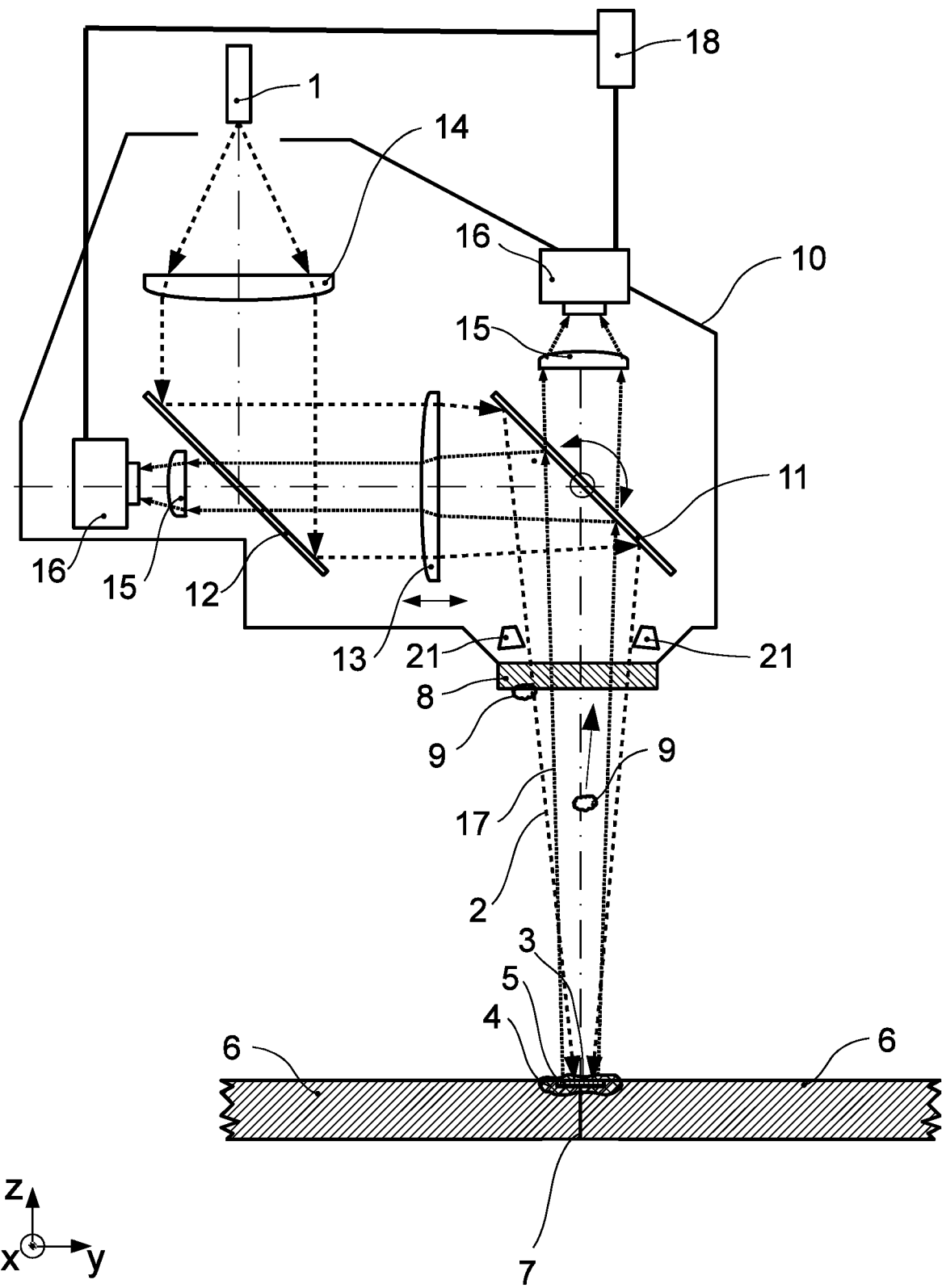
FIG. 1 a laser processing head in longitudinal section.

The two workpieces 6 to be joined in a laser welding process in FIG. 1, in this exemplary embodiment two metal sheets, touch each other at the joint 7.

The laser beam 2 generated by the laser beam generator 1 is guided by means of the scanner optics 10 perpendicular to the end face of the joint 7 at the welding position 3. The interaction of the laser beam 2 with the workpiece material forms the interaction zone 4, in which the material of the workpieces 6 is heated and partially melted.

The electromagnetic radiation 17 is generated in the interaction zone 4 as a result of (i) the reflection of the laser light, (ii) the reflected light emitted by the illumination modules 21 onto the surface of the workpieces 6 and (iii) the emission of radiation near the surface of the workpieces 6 due to heating.

The scanner optics 10 of the laser processing head guides and deflects the laser beam 2 onto the surface of the workpieces 6. For this reason, the scanner optics 10 comprises the collimation unit 14, the semipermeable deflection unit 12, the focusing unit 13 and the active deflection unit 11. The protective glass 8 protects the sensitive optical components from the dirt particles 9.

The measurement of the electromagnetic radiation 17 emanating from the interaction zone 4 is performed by means of the two optical image capture systems 16, in this exemplary embodiment a camera, with an upstream camera focusing unit 15. The electromagnetic radiation 17 is detected within the near infrared wavelength range by each image acquisition system 16.

The image data captured by the image capture systems 16 is forwarded to the image processing unit 18 where it is stored as a computer-readable image file in an image file repository using the lossless JPEG File Interchange Format.

To monitor the degree of contamination of the protective glass 8, the image processing unit 18 determines a file size value for each image, which in this case is the file size of the JPEG file.

Figure 2:
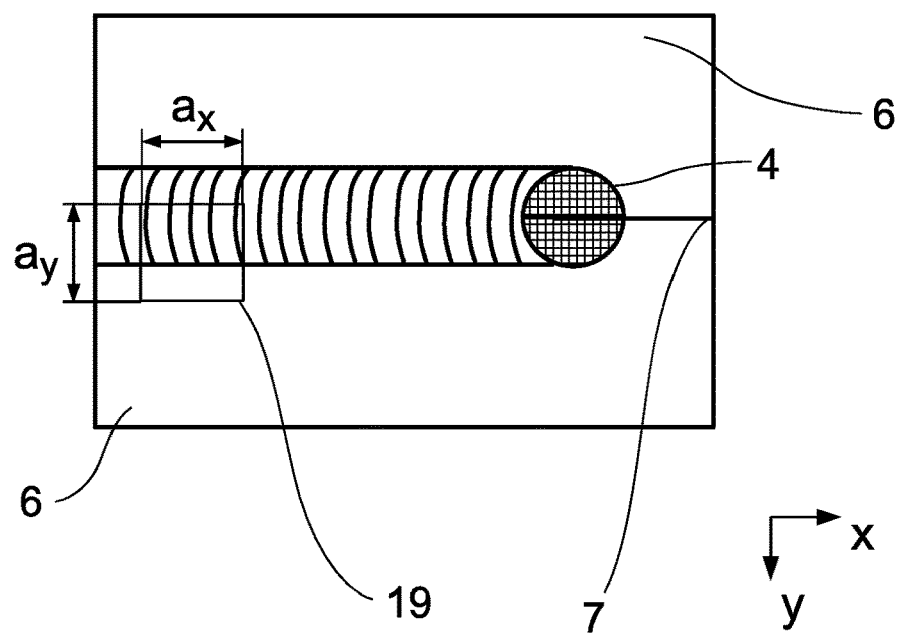
FIG. 2 a weld seam in plan view.

In the plan view of the workpieces 6 and the joint 7 shown in FIG. 2, a possible image section 19 is shown by way of example. The image section 19 is rectangular in this example, having a length $a_x$ in the x-direction and a width $a_y$ in the y-direction. The same image section 19 may be observed by all of the image capture systems, however, in this example only the image section 19 observed by a first of the image capture systems is shown.

At specified, recurring capture-times, an image of the image section 19 is captured and the file size of the JPEG file is determined as the file size value kB.

Figure 3:
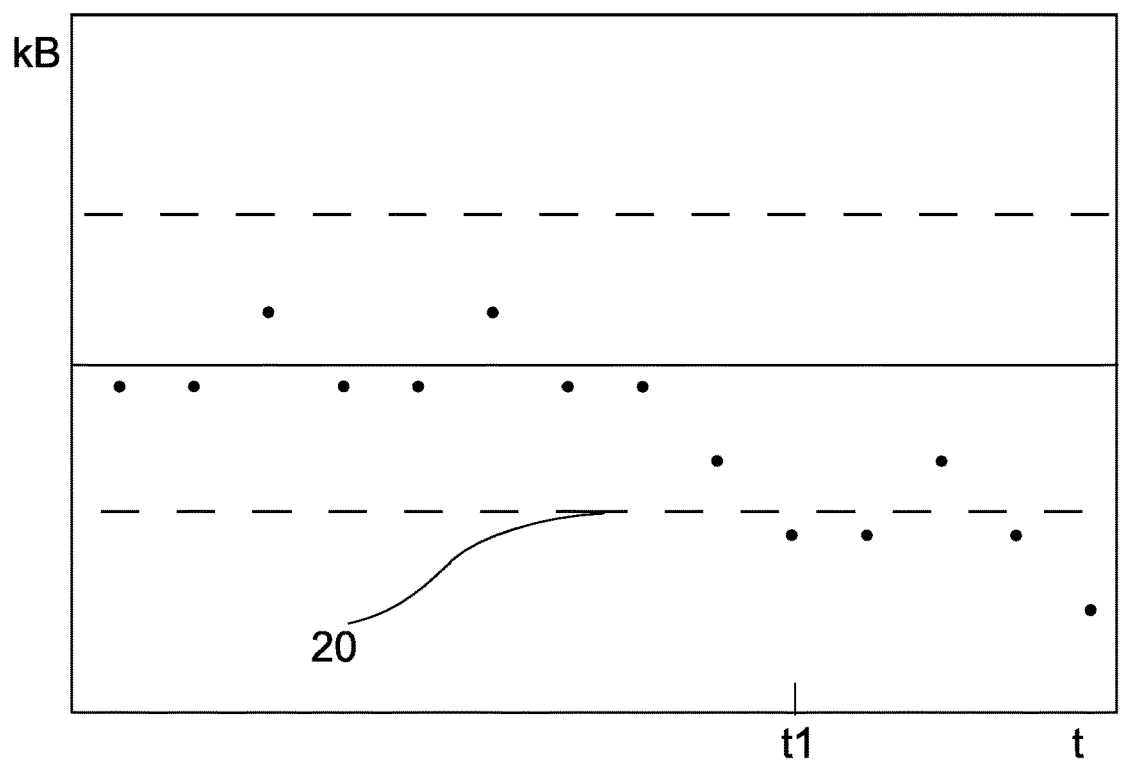
FIG. 3 a chronological sequence of file size values.

For the embodiment of the method for monitoring a protective glass shown in FIG. 3, it is analyzed whether the file size value kB becomes progressively smaller and ultimately heaps below the threshold value 20, here the standard deviation. As can be seen on the right hand side of the diagram shown in FIG. 3, four out of five temporally successive file size values kB fall below the threshold value 20. In accordance with the rule applicable to this specific example that a signal is to be generated if 80% of the last five file size values kB determined are below the threshold value 20, an error signal is thus generated. A warning signal is already generated at time t1, since the rule for generating the warning signal stipulates that a maximum of 20% of the last ten file size values determined is greater than the respective file size value kB determined immediately before, i.e. the file size values kB decrease for a specified minimum number of capture times that follow each other indirectly consecutive in time.

LIST OF REFERENCE NUMERALS 1 laser beam generator
2 laser beam
3 welding position/processing position
4 interaction zone
5 reflecting surface
6 workpieces
7 joint
8 protective glass
9 contamination/dirt particle
10 Scanner optics
11 active deflection unit
12 semipermeable deflection unit
13 Focusing unit
14 collimation unit
15 camera focusing unit
16 image capture system
17 electromagnetic radiation
18 image processing unit
19 image section
20 threshold value for file size value
21 illumination module
$a_x$ length in the x-direction
$a_y$ width in the y-direction
t time t1 point in time
kB file size value

The invention claimed is:

1. A method for monitoring a protective glass of a laser processing device with respect to contamination during laser processing of at least one workpiece, characterized by the following steps:

repeatedly capturing image sections of the at least one workpiece through the protective glass by means of at least two image capture systems at given capture-times during laser processing, wherein the at least one workpiece is illuminated in an area of the image sections to be captured, wherein a geometric dimension and/or shape of each image section captured by one of the at least two image capture systems exhibits a geometric dimension and/or shape different to a geometric dimension and/or shape of an image section captured by another one of the at least two image capture systems;

converting each of the captured image sections into an image file readable by a computer and storing each of the image files in an image file repository, whereby converting is done by applying a compression algorithm based on frequency analysis of the respective image section;

determining at each capture-time a file size value for each image file, wherein said file size value at least is based on a file size of the respective image file recorded at said capture-time; and generating a signal, if for a majority of the image capture systems a predefined minimum number of file size values assigned to the respective image capture system are decreasing in size and/or are smaller than a threshold value assigned to the respective image capture system wherein said file size values are determined at capture-times in direct or indirect succession over time.

2. The method for monitoring a protective glass according to claim 1, characterized in that the file size value is determined by calculating a mean value of file sizes of a given number of image files, wherein respective image sections are captured in chronological order in immediate succession.

3. The method for monitoring a protective glass according to claim 1, characterized in that the captured image sections are converted in accordance with a JPEG compression method.

4. The method for monitoring a protective glass according to claim 1, characterized in that in case of a decreasing file size value
a warning signal is generated, if the file size value for a given number of consecutive capture-times is smaller than a predefined first threshold value, and
an error signal is generated, if the file size value for a given number of consecutive capture-times is smaller than a predefined second threshold value, wherein the second threshold value is smaller than the first threshold value.

5. The method for monitoring a protective glass according to claim 1, characterized in that the image sections are captured by means of an infrared camera.

6. The method for monitoring a protective glass according to claim 1, characterized in that an image acquisition system present in the laser processing device is used as image capture system.

7. The method for monitoring a protective glass according to claim 1, characterized in that the surface area of the workpiece captured by the image sections is illuminated by means of at least one light source.

8. The method for monitoring a protective glass according to claim 1, characterized in that by means of the image capture system a film is recorded during the laser processing, wherein at predetermined, recurring capture-times at least one image section of a single image of the film is compressed by means of the frequency analysis based compression algorithm and is stored as image file in the image file repository.

* * * * *